Sept. 18, 1928.
E. W. N. BOOSEY
1,684,570
CLOSET FLANGE
Filed Nov. 18, 1922
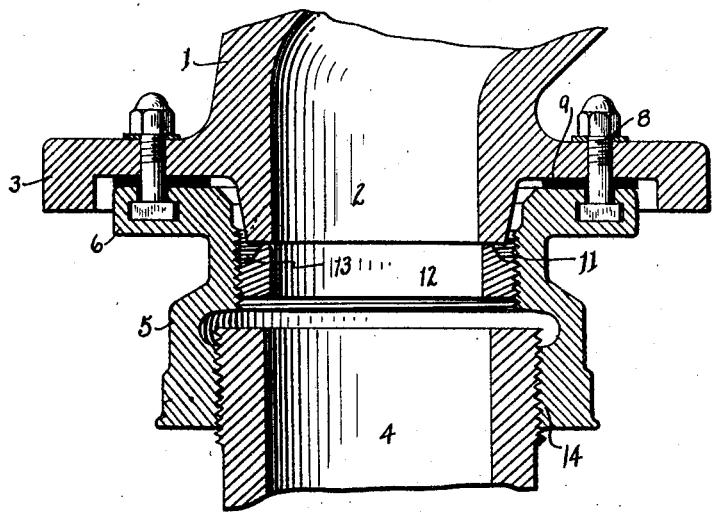
Fig. 1.
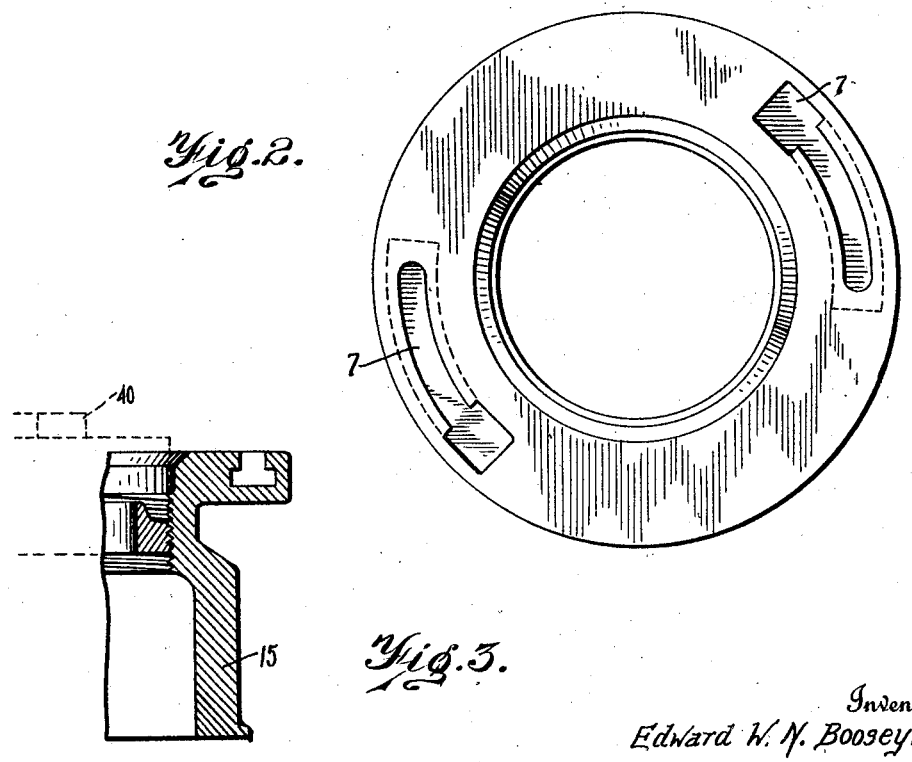
Fig. 2.
Fig. 3.
Inventor
Edward W. N. Boosey.
By
Attorney Patented Sept. 18, 1928.

1,684,570

UNITED STATES PATENT OFFICE.

EDWARD W. N. BOOSEY, OF DETROIT, MICHIGAN.

CLOSET FLANGE.

Application filed November 18, 1922. Serial No. 601,857.

This invention relates to closet flanges utilized in connecting a closet bowl or other fixture with the usual discharge pipe, and the object of the invention is to provide a flange for closet bowls and other structures adapted to be connected with a discharge pipe and provided with an adjustable means for making a tight joint between the horn of the bowl and the flange, and also providing a means whereby upon installation of the piping, a plug may be utilized with the flange to seal the pipe opening preparatory to testing the system for leakage. It is therefore an object of the invention to provide a construction adaptable for use for the double purpose of sealing the horn of the bowl, pipe or other device to be connected with the discharge pipe in a manner to prevent leakage and to provide a flange connection permitting the use of a plug to seal the discharge pipe. These and other objects and novel features of the invention are hereinafter more fully described and claimed, and the preferred form of construction of a device embodying my invention is shown in the accompanying drawing in which—

Fig. 1 is a vertical section showing my improved connection in use between the closet bowl and the discharge piping.

Fig. 2 is a plan view of my improved flange.

Fig. 3 is a detail showing a section of my improved device of a form adapting it to be caulked to the discharge piping.

Closet bowls and other plumbing fixtures are usually provided with a part called a "horn" projecting into the piping. Closet bowls are sometimes provided with a long horn and sometimes with a short horn, the practice varying in different parts of the country, and building codes vary, sometimes demanding a round, flat, or angular gasket between the flange of the bowl and the connection. In the drawing, one end of a closet bowl is indicated at 1, the horn is indicated at 2 and the flange of the bowl is indicated at 3. The discharge piping for the bowl is indicated at 4. My improved flange connection, shown at 5, has a lateral flange 6 recessed as indicated at 7 in the Fig. 2 to permit introduction of bolts 8 for securing the bowl flange to the flange 6. The upper face of the flange 6 may be provided with a flat gasket indicated at 9 but it is to be understood that any shape of gasket may be utilized as may be determined by the shape of this flange or the space between the connection and the horn 2 of the bowl. The horn 2 of the bowl extends into the throat of the flange connection as indicated, and this throat, at a distance below the upper surface of the flange is threaded as indicated at 11. A metal ring 12 is threaded for insertion in the throat and, by reason of the threaded relation of the ring in the throat, it may be adjusted vertically to accommodate different lengths of horns 2, the purpose being to bring the upper edge of the ring 2 practically into contact with the lower edge of the horn when the parts are assembled. The shape of the upper surface of the ring in conjunction with the wall of the flange provides a ring like pocket 13 which may be filled with cement thus forming an effectual seal between the ring and the bowl and the wall of the flange. The ring prevents possibility of the crowding down of the gasket into the waste pipe. The lower end of the flange connection 5 may be threaded as indicated at 14 for use in conjunction with the threaded pipe 4, or it may be formed with an elongated wall 15 as indicated in Fig. 3 shaped to permit caulking to a discharge pipe having a hub end to receive the same, it not being material to this invention whether the pipe end of the flange connection be formed with threads as shown in Fig. 1 or formed to permit caulking as indicated in Fig. 3, both of which methods are commonly in use in connecting plumbing fixtures.

My improved flange connection is thus adapted for uniform use with various fixtures avoiding necessity of having a type of flange connection for every type of fixture resulting in considerable saving in this respect and also a further object of the invention is secured by providing the threaded throat 11. In installing a plumbing system in a building, it is necessary, after installation, and previous to attachment of the fixtures to the system, to test the same to determine whether leakage exists in the system, and it is ordinarily difficult to plug the open ends of the piping for making such test. By use of my improved flange connection, this connection may be placed at the time of installation of the piping and, by reason of its having a threaded throat 11, an ordinary threaded plug 40 may be screwed into place as indicated in Fig. 3 to seal the piping at that end for the purpose of testing the same. The plug is removed previous to attachment of the fixture at which time the ring 12 is positioned to correspond to the position of the horn, which may be fairly long as indicated in Fig. 1 in full lines or if short, the ring may be raised to position indicated by dotted lines in said figure. Thus, this device is adaptable for most fixtures requiring connection with a discharge conduit.

Having thus briefly described my invention, what I claim is:—

1. The combination with a closet bowl having a base and a discharge horn extending downwardly from the base, of a discharge fitting comprising a tubular body having a lateral flange at one end, means for securing the flange to the bowl base, a gasket between said flange and base, the said body having an internally threaded throat into which the horn extends, a ring member in threaded relation with the throat and movable to engage the end of the horn, said member being shaped at the upper end and exterior surface to provide a pocket between the said horn end and the threaded throat to receive a sealing material, said body being further provided with an enlarged portion provided with internal threads in spaced relation with the threaded throat adapting said body to be attached to an externally threaded pipe providing a conduit having an internal diameter at least as great as the internal diameter of said horn and ring.

2. A device of the character described comprising a tubular body member having a lateral flange in one end adapted for attachment to a plumbing fixture and internally threaded at the opposite end for attachment to a discharge conduit, the said body member having a threaded throat of less internal diameter than the said threaded end of the body and positioned between the ends of the body, and an externally threaded ring member in the said throat shaped at its upper end and exterior surface to provide a pocket for a sealing material substantially as described.

In testimony whereof, I sign this specification.

EDWARD W. N. BOOSEY.